(12) United States Patent
Ranson et al.

(10) Patent No.: US 12,613,152 B2
(45) Date of Patent: Apr. 28, 2026

(54) METHODS, SYSTEMS, AND COMPUTER READABLE MEDIA FOR UTILIZING DIGITAL REPLICATION TO MEASURE STRUCTURAL DEFORMATION

(71) Applicant: 3D STRAIN, LLC, Augusta, GA (US)

(72) Inventors: William F. Ranson, Columbia, SC (US); Gregory L. Hovis, Augusta, GA (US); Lex T. Pavlo, West Chester, PA (US)

(73) Assignee: 3D STRAIN LLC, Augusta, GA (US)

( * ) Notice: Subject to any disclaimer, the term of this patent is extended or adjusted under 35 U.S.C. 154(b) by 508 days.

(21) Appl. No.: 18/028,459

(22) PCT Filed: Sep. 28, 2021

(86) PCT No.: PCT/US2021/052328
§ 371 (c)(1),
(2) Date: Mar. 24, 2023

(87) PCT Pub. No.: WO2022/067229
PCT Pub. Date: Mar. 31, 2022

(65) Prior Publication Data
US 2023/0366758 A1 Nov. 16, 2023

Related U.S. Application Data

(60) Provisional application No. 63/084,465, filed on Sep. 28, 2020.

(51) Int. Cl.
*G01L 1/24* (2006.01)
*B33Y 50/00* (2015.01)

(52) U.S. Cl.
CPC ............... *G01L 1/24* (2013.01); *B33Y 50/00* (2014.12)

(58) Field of Classification Search
None
See application file for complete search history.

(56) References Cited

U.S. PATENT DOCUMENTS

| | | | |
|---|---|---|---|
| 2011/0317896 A1 | 12/2011 | Huber et al. | |
| 2013/0031987 A1 | 2/2013 | Beauvais et al. | |
| 2020/0064812 A1 | 2/2020 | Sims et al. | |

FOREIGN PATENT DOCUMENTS

JP 2014002027 A * 1/2014

OTHER PUBLICATIONS

English machine translation of Yumoto et al. (JP 2014002027 A) (Year: 2014).*

(Continued)

*Primary Examiner* — Walter L Lindsay, Jr.
*Assistant Examiner* — Geoffrey T Evans
(74) *Attorney, Agent, or Firm* — Sage Patent Group

(57) ABSTRACT

A method for utilizing digital replication to measure structural deformation includes receiving a first set of digitized spatial data of a measurement volume and a target symbol comprising a plurality of surface features present on an object surface, utilizing the first set of digitized spatial data to generate a first and second digital replication of the measurement volume and the target symbol and determining spatial orientation of the target symbol utilizing positions of the plurality of surface features within a digital coordinate system corresponding to the first digital replication and subsequently establishing a first set of position vectors contained within the first digital replication, wherein endpoints of each of the position vectors are defined by the coordinate positioning of a pair of the surface features in the first digital replication, and comparing the first and second sets of position vectors to determine relative displacements within the target symbol.

21 Claims, 10 Drawing Sheets

(56) References Cited

OTHER PUBLICATIONS

International Search Report and Written Opinion corresponding to International Patent Application No. PCT/US2021/052328 dated Dec. 29, 2021.

Xu et al. (2017) "A Reverse Compensation Framework for Shape Deformation Control in Additive Manufacturing," J. Comput. Inf. Sci. Eng., vol. 17, No. 2, 9 pages (https://doi.org/10.1115/1.4034874).

Yang et al. (2017) "Terrestrial Laser Scanning Technology for Deformation Monitoring and Surface Modeling of Arch Structures," Composite Structures, vol. 169, pp. 173-179.

* cited by examiner

204

202

302

402

502

902

900

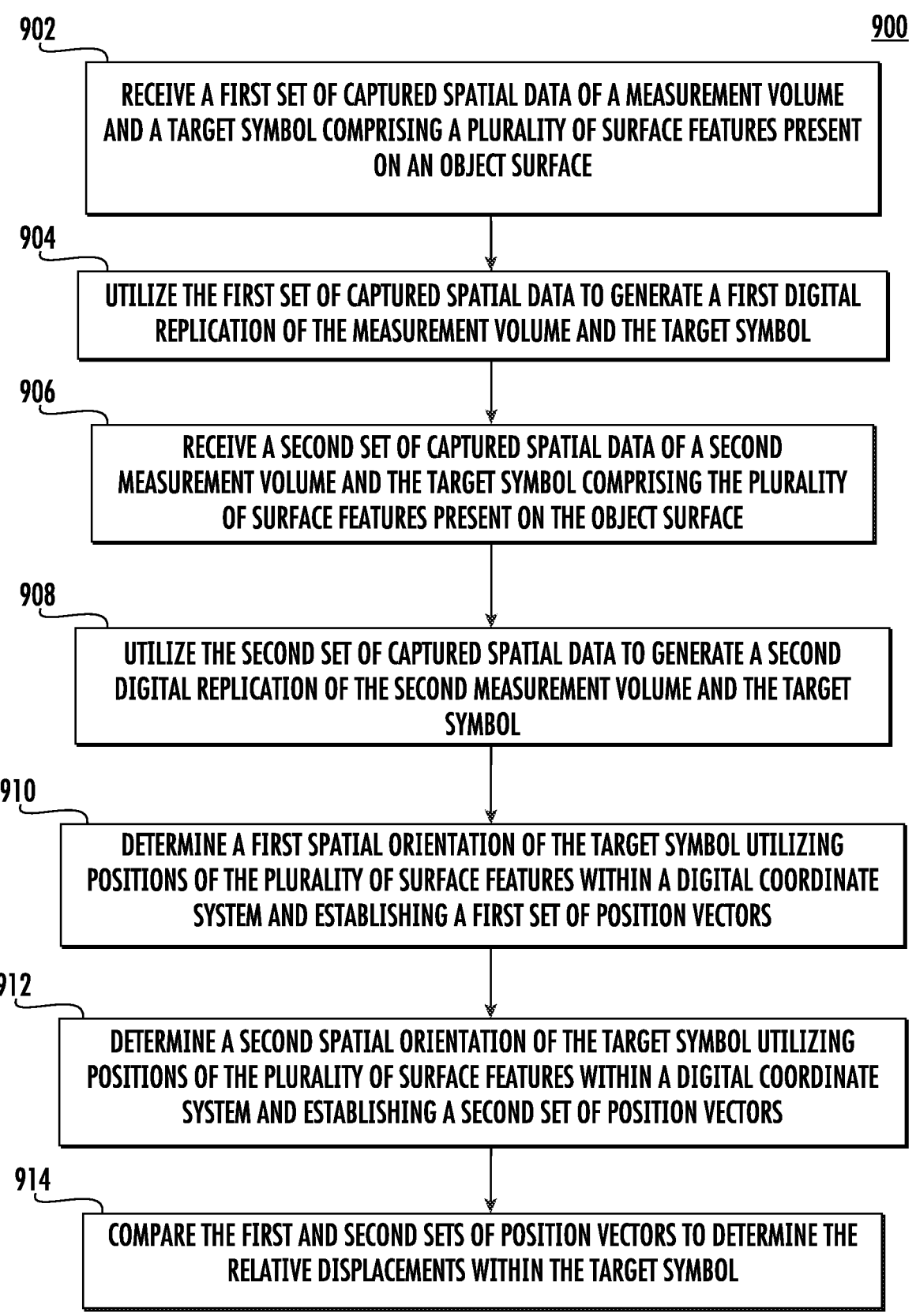

RECEIVE A FIRST SET OF CAPTURED SPATIAL DATA OF A MEASUREMENT VOLUME AND A TARGET SYMBOL COMPRISING A PLURALITY OF SURFACE FEATURES PRESENT ON AN OBJECT SURFACE

904

UTILIZE THE FIRST SET OF CAPTURED SPATIAL DATA TO GENERATE A FIRST DIGITAL REPLICATION OF THE MEASUREMENT VOLUME AND THE TARGET SYMBOL

906

RECEIVE A SECOND SET OF CAPTURED SPATIAL DATA OF A SECOND MEASUREMENT VOLUME AND THE TARGET SYMBOL COMPRISING THE PLURALITY OF SURFACE FEATURES PRESENT ON THE OBJECT SURFACE

908

UTILIZE THE SECOND SET OF CAPTURED SPATIAL DATA TO GENERATE A SECOND DIGITAL REPLICATION OF THE SECOND MEASUREMENT VOLUME AND THE TARGET SYMBOL

910

DETERMINE A FIRST SPATIAL ORIENTATION OF THE TARGET SYMBOL UTILIZING POSITIONS OF THE PLURALITY OF SURFACE FEATURES WITHIN A DIGITAL COORDINATE SYSTEM AND ESTABLISHING A FIRST SET OF POSITION VECTORS

912

DETERMINE A SECOND SPATIAL ORIENTATION OF THE TARGET SYMBOL UTILIZING POSITIONS OF THE PLURALITY OF SURFACE FEATURES WITHIN A DIGITAL COORDINATE SYSTEM AND ESTABLISHING A SECOND SET OF POSITION VECTORS

914

COMPARE THE FIRST AND SECOND SETS OF POSITION VECTORS TO DETERMINE THE RELATIVE DISPLACEMENTS WITHIN THE TARGET SYMBOL

FIG. 9

METHODS, SYSTEMS, AND COMPUTER READABLE MEDIA FOR UTILIZING DIGITAL REPLICATION TO MEASURE STRUCTURAL DEFORMATION

PRIORITY CLAIM

This application claims the priority benefit of U.S. Provisional Patent Application Ser. No. 63/084,465, filed Sep. 28, 2020, the disclosure of which is incorporated herein by reference in its entirety.

TECHNICAL FIELD

The subject matter described herein relates to determining deformation in structure components and corresponding creep management. More particularly, the subject matter described herein relates to methods, systems, and computer readable media for utilizing digital replication to measure structural deformation.

BACKGROUND

Historical development of the measure of the relative extension of a small line segment in deformable bodies is largely based on the principle of the positioning of points in a body before deformation and the subsequent determination of the resulting change in distance after deformation. Experimental methods that have conformed more closely to this definition have progressed primarily by electrical analogies, optical methods of fringe interference, and recent developments occurring in computer analysis techniques based on the optical methods. Although varying considerably in different applications, these methods are similar in the sense that the undeformed and deformed coordinate systems remain fixed to each other, e.g., either by being attached to the body of interest or fixed in space.

SUMMARY

A method for utilizing digital replication to measure structural deformation includes receiving a first set of digitized spatial data of a measurement volume and a target symbol comprising a plurality of surface features present on an object surface, utilizing the first set of digitized spatial data to generate a first digital replication of the measurement volume and the target symbol, receiving a second set of digitized spatial data of a second measurement volume and the target symbol comprising the plurality of surface features present on the object surface, and utilizing the second set of digitized spatial data to generate a second digital replication of the second measurement volume and the target symbol. The method also includes determining a first spatial orientation of the target symbol utilizing positions of the plurality of surface features within a digital coordinate system corresponding to the first digital replication and subsequently establishing a first set of position vectors contained within the first digital replication, wherein endpoints of each of the position vectors are defined by the coordinate positioning of a pair of the surface features in the first digital replication, determining a second spatial orientation of the target symbol utilizing positions of the plurality of surface features within a digital coordinate system corresponding to the second digital replication and subsequently establishing a second set of position vectors contained within the second digital replication, wherein endpoints of each of the position vectors are defined by the coordinate positioning of a pair of the surface features in the second digital replication, and comparing the first and second sets of position vectors to determine relative displacements within the target symbol.

According to another aspect of the subject matter described herein, a method wherein each of the first digitized spatial data and the second digitized spatial data is obtained by a three-dimensional (3D) scanning device.

According to another aspect of the subject matter described herein, a method wherein the plurality of surface features comprise concave paraboloids and/or convex paraboloids.

According to another aspect of the subject matter described herein, a method wherein the surface features are naturally occurring in the object surface.

According to another aspect of the subject matter described herein, a method wherein the surface features are formed during the casting or machining of the object surface, created by additive or subtractive methods, formed by imbedding in a coating, and/or formed by ablating a thermal barrier coating.

According to another aspect of the subject matter described herein, a method wherein each of the first set of position vectors and the second set of position vectors includes at least six position vectors.

According to another aspect of the subject matter described herein, a method wherein the digital coordinate system includes a digital Cartesian coordinate system, a digital polar coordinate system, or a digital NTB coordinate system.

According to another aspect of the subject matter described herein, a method wherein the relative displacements are used to determine tri-axial strain components exhibited in a small area of the object surface.

In another embodiment, a system utilizing digital replication to measure structural deformation includes at least one processor, a memory element, and a volumetric deformation analysis engine (VDAE) that is stored in the memory element and when executed by the at least one processor is configured to receive a first set of digitized spatial data of a measurement volume and a target symbol comprising a plurality of surface features present on an object surface, utilize the first set of digitized spatial data to generate a first digital replication of the measurement volume and the target symbol, receive a second set of digitized spatial data of a second measurement volume and the target symbol comprising the plurality of surface features present on the object surface, and utilize the second set of digitized spatial data to generate a second digital replication of the second measurement volume and the target symbol. The VDAE of the system is further configured to determine a first spatial orientation of the target symbol utilizing positions of the plurality of surface features within a digital coordinate system corresponding to the first digital replication and subsequently establishing a first set of position vectors contained within the first digital replication, wherein endpoints of each of the position vectors are defined by the coordinate positioning of a pair of the surface features in the first digital replication, determine a second spatial orientation of the target symbol utilizing positions of the plurality of surface features within a digital coordinate system corresponding to the second digital replication and subsequently establishing a second set of position vectors contained within the second digital replication, wherein endpoints of each of the position vectors are defined by the coordinate positioning of a pair of the surface features in the second digital replication, and compare the first and second sets of position vectors to determine relative displacements within the target symbol.

According to another aspect of the subject matter described herein, a system wherein each of the first digitized spatial data and the second digitized spatial data is obtained by a three-dimensional (3D) scanning device.

According to another aspect of the subject matter described herein, a system wherein the plurality of surface features comprise concave paraboloids and/or convex paraboloids.

According to another aspect of the subject matter described herein, a system wherein the surface features are naturally occurring in the object surface.

According to another aspect of the subject matter described herein, a system wherein the surface features are formed during the casting or machining of the object surface, created by additive or subtractive methods, formed by imbedding in a coating, and/or formed by ablating a thermal barrier coating.

According to another aspect of the subject matter described herein, a system wherein each of the first set of position vectors and the second set of position vectors includes at least six position vectors.

According to another aspect of the subject matter described herein, a system wherein the digital coordinate system includes a digital Cartesian coordinate system, a digital polar coordinate system, or a digital NTB coordinate system.

According to another aspect of the subject matter described herein, a system wherein the relative displacements are used to determine tri-axial strain components exhibited in a small area of the object surface.

The subject matter described herein may be implemented in hardware, software, firmware, or any combination thereof. As such, the terms "function" "node", "engine" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 9 illustrates a flow chart depicting an exemplary method for utilizing digital replication to measure structural deformation according to an embodiment of the subject matter described herein.

DETAILED DESCRIPTION

Figure 1:
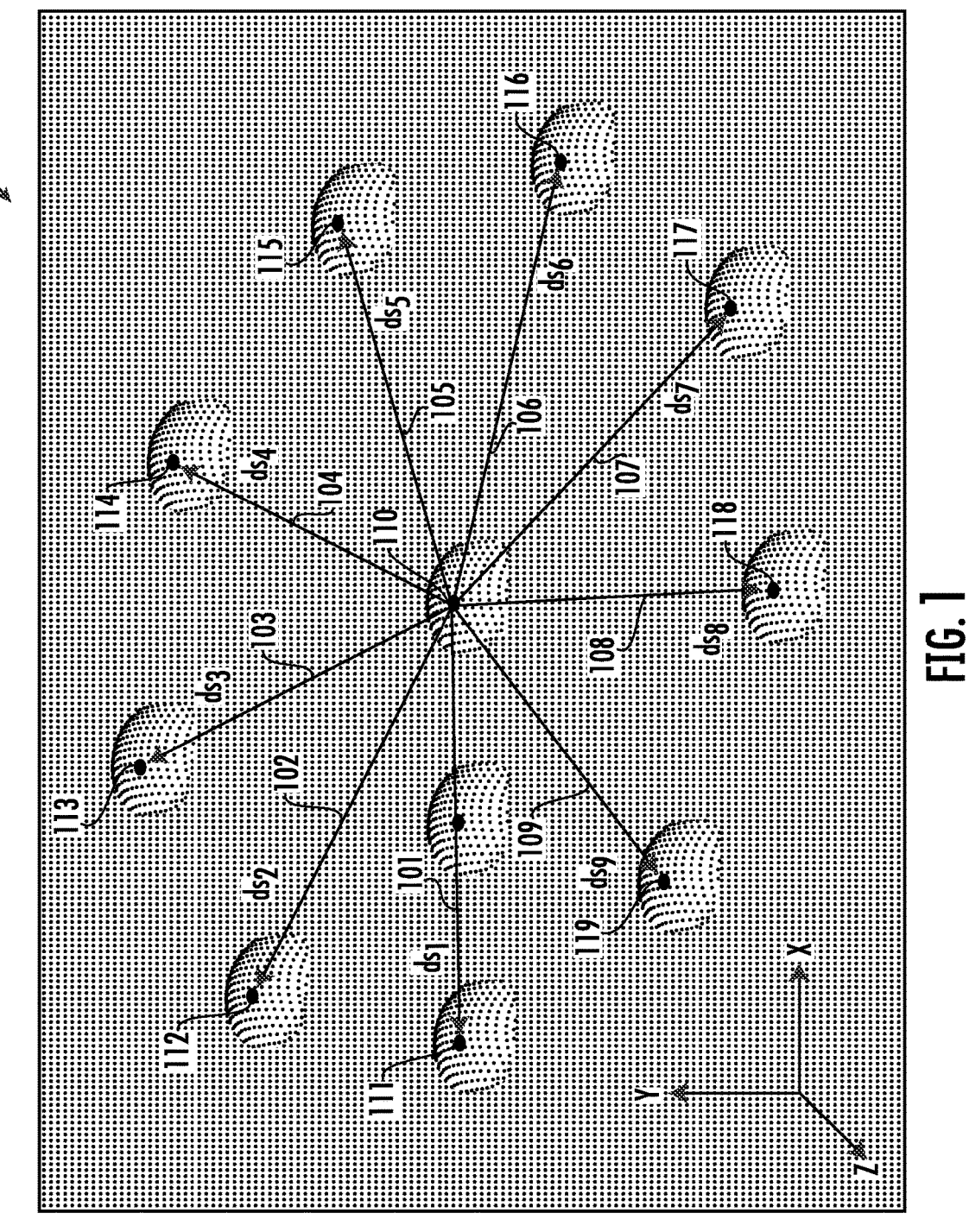
FIG. 1 illustrates an exemplary random array of surface features and associated plurality of position vectors in a digital coordinate space according to an embodiment of the subject matter described herein.

The subject matter described herein relates to methods, systems, and computer readable media for utilizing digital replication to measure structural deformation. In particular, the disclosed subject matter pertains to the development of a measurement technique and application that utilizes a digital coordinate space in conjunction with volumetric surface recognition methods. The volumetric surface recognition methods provide an exact digital replication of the surface of a component or object body being assessed. The disclosed measurement technique and application most accurately conforms to the principle of target points (e.g., surface feature points of a target symbol) present in two separate states or configurations (e.g., a first state and a second state, a first configuration and second configuration, etc.). For example, the exact positions of digital surface points existing in a first state characterized by an undeformed object body (i.e., before deformation) can be mapped to the corresponding digital surface points present in a second state that is characterized by the same object body existing in a deformed state (e.g., a deformed digital surface of local features of either a macro or micro surface topology of the object body that is exhibiting creep and/or structural deformation). Moreover, the disclosed method does not require digital coordinates to remain fixed to an object body or fixed in space (as employed in previous methods) since the digital surfaces of the first state (e.g., undeformed configuration) and the second state (e.g. deformed configuration) are recorded independently and are related and/or mapped through a coordinate transformation.

As used herein, relative displacement is defined in terms of a change in length of a small straight-line segment (that exists in a target area or measurement volume) with respect to its positioning in a three-dimensional digital coordinate system due to the deformation of an object body or component. Examples of relative displacement include, but are not limited to, relative elongation, relative contraction, and/or or the like. Since a line segment (e.g., a position vector, deformation vector, displacement vector, etc.) can be measured and defined in terms of its two end points, the relative displacement of the line segment can be characterized in terms of the position change of these two end points transpiring between a first configuration (e.g., an undeformed state) and a second configuration (e.g., a deformed state) of an object body due to any change in physical state, such as creep and/or structural deformation. Specifically, the disclosed subject matter relates to a volumetric deformation analysis and assessment method that is based on the relative measurement of a straight line that exists between the coordinates of two neighboring surface features within a larger object. In some embodiments, at least six or more non-collinear intersecting line segments (e.g., position vectors) are deemed sufficient to measure the relative displacement and calculate the tri-axial strain components within a small volume (e.g., a three-dimensional target area or measurement volume) of the larger object body. Alternatively, only 3 or more non-collinear intersecting line segments or position vectors are needed to determine the strain components in a two dimensional space or planar target area. However, multiple features can be used in this form of measurement which provides for an overdetermined set of displacement equations and uniquely allows for measurement redundancy within the measurement area (e.g., utilizing i) 6 or more non-collinear intersecting line segments in 3D measurements and ii) 3 or more non-collinear intersecting line segments in 2D measurements). Notably, the relative location of the same surface feature points existing in different states (e.g., undeformed state and deformed state or, alternatively, a first deformed state and a second deformed state) provides regional deformation fields using a volumetric deformation analysis method for overdetermined set of strain transformation equations. In some embodiments, the disclosed algorithm determines a first set of position vectors, defined by two end points within the target geometry for each position vector connecting two unique points included in the target symbol geometry and subsequently compares the first set of position vectors to a second set of position vectors with the corresponding exact set of end points (obtained at a different point in time). The disclosed algorithm utilizes the first and second set of position vectors to generate a three-dimensional displacement equation (or mapping function) that mathematically describes the volumetric deformation causing the relative displacement between the two unique points. Each displacement equation contains six coefficients representing the unknow normal strain and shear strain components within the target symbol region. A minimum of six three-dimensional displacement equations are required to solve for the six unknowns, yet more than six equations provide for an overdetermined solution with added benefits of calculation redundancy, reduced error, and improved accuracy. Moreover, the method disclosed herein differs from conventional deformation measurements in its ability to transform surface feature properties into points inside a volumetric digital cartesian coordinate system while maintaining sufficient accuracy.

FIG. 1 illustrates an exemplary random array 100 of surface features and a plurality of position vectors in a digital coordinate space according to an embodiment of the subject matter described herein. Specifically, FIG. 1 depicts a plurality of surface features 110-119 represented as paraboloids existing on an object surface. In particular, the respective locations of each of the surface features 107-118 can be represented by points existing in an Cartesian coordinate space (e.g., an XYZ coordinate space). Further, FIG. 1 depicts a plurality of position vectors 101-109, each of which is represented as a small line segment dS_i, where i=1 . . . 9. Each of the position vectors 101-109 is defined by two end points (i.e., surface features) within the array 100 that can be defined by a deformation measurement area. Notably, the set of position vectors 101-109 (i.e., line segments dS_i) can be collectively utilized to determine and/or measure the local deformation exhibited within a defined deformation measurement area. For example, the set of position vectors 101-109 can be arranged in any fashion desired as illustrated in the random array 100 depicted in FIG. 1.

In addition to the concept of a random array of surface features existing in a defined deformation measurement area, the disclosed subject matter further relates to coordinate transformation measurements that are conducted in a digital coordinate space. For example, line segment lengths and/or vector lengths can be preserved across a coordinate transformation. This is important to note for at least two reasons. First, all deformations occurring in an object body are three-dimensional (3D), yet the third dimension is often neglected by conventional deformation measurement algorithms that typically only employ one-dimensional or two-dimensional related technology. Secondly, the disclosed volumetric deformation analysis algorithm places minimal dependence on the orientation of the scanning device. These details are explicit and are necessary conditions for conducting correct calculations relating to strain measurement. For example, two dimensional line segment lengths measured in a reference configuration are generally three-dimensional in any subsequent measurement. This is a novel feature of the disclosed volumetric deformation analysis system. Notably, a 2D imaging method that is measured in a reference configuration will not function properly for any subsequent measurement due to the three-dimensional requirements. As such, three-dimensional scanning technology is required for determining these types of measurements.

Figure 2:
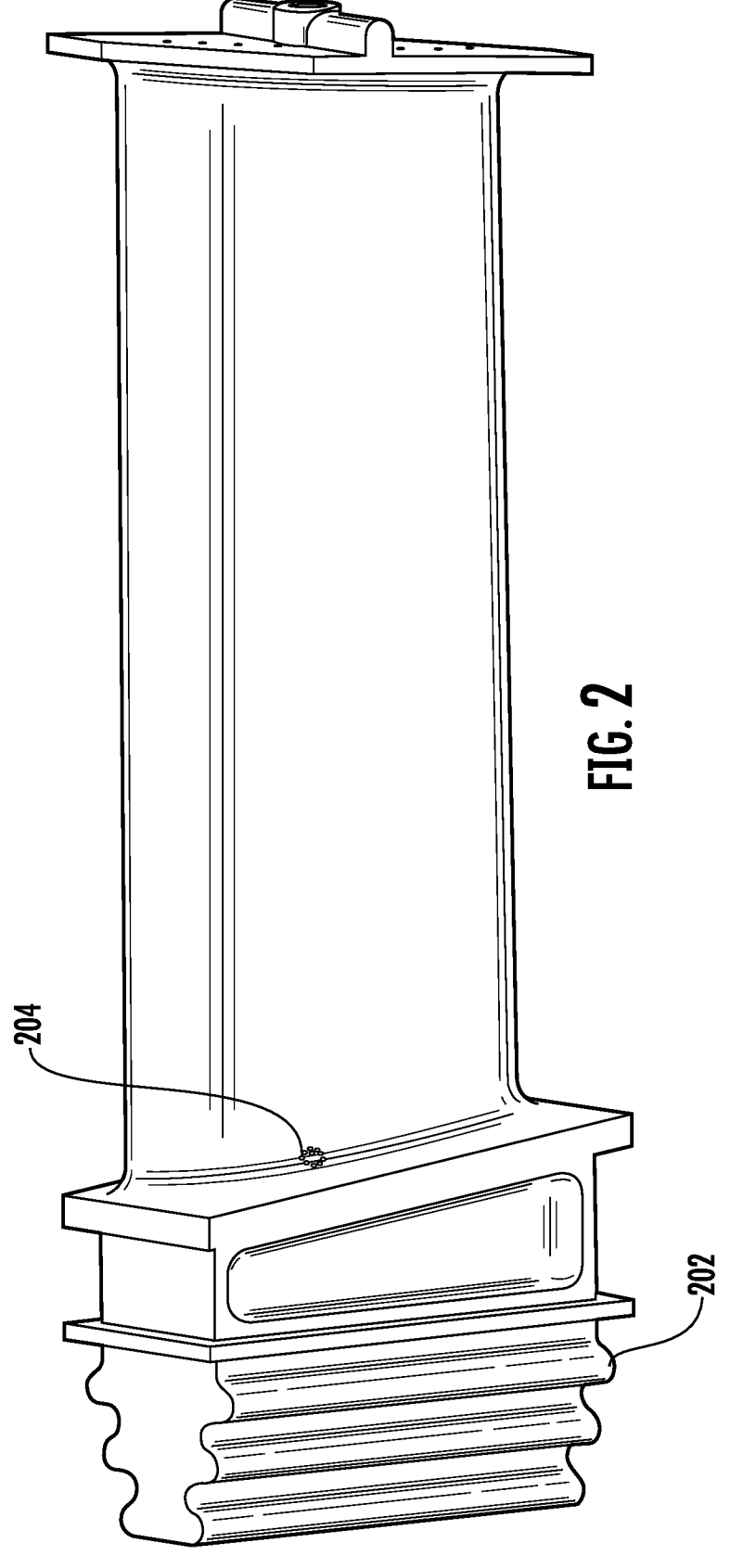
FIG. 2 illustrates an exemplary turbine blade component including a target symbol according to an embodiment of the subject matter described herein.

Although the disclosed volumetric deformation analysis (VDA) method can be applied to any object surface or component, the following description and Figures utilize depictions of a gas turbine blade as an example embodiment. Notably, it is understood by those of ordinary skill in the art that the scope of the disclosed subject matter is not limited to this exemplary embodiment. In particular, FIG. 2 illustrates an exemplary turbine blade component 202 that includes a target symbol 204 according to an embodiment of the subject matter described herein. In some embodiments, a target symbol (e.g., target symbol 204) comprises an array of small paraboloid (or quasi-paraboloid) convex or concave surface features. Paraboloid surface features have unique shape and volume properties that define specific points in a digital cartesian space. These points established by the surface features serve as a means for measurement by the volumetric deformation analysis algorithm. While many possible geometric configurations can be used, each of the surface features of the array can be matched or mapped to a three-dimensional (3D) scanning technology measurement volume that is generated by the three-dimensional scanning device. For example, the surface features associated with target symbol 204 shown in FIG. 2 must be discernable and be detectable by a device employing three-dimensional scanning technology. Namely, target symbol 204 is depicted in FIG. 2 as comprising small paraboloid surface features that are positioned near the root of the turbine blade component 202. Target symbol 204 may further comprise surface features that can either exist naturally (e.g., naturally occurring on the turbine blade surface) or be manufactured on the surface of turbine blade component 202. More specifically, the surface features can be naturally occurring surface contours, imperfections, and/or can instead be intentionally formed during the component part casting or machining process. Alternatively, the surface features can be created using additive or subtractive methods or imbedded in a coating. Further, the surface features can be formed by ablating a coating (such as a thermal barrier coating) that is applied to the surface of the turbine blade or other component.

In some embodiments, the target symbol surface detail can be initially captured with the use of a mold and/or physical impression. Notably, the 3D scanning device and deformation analysis algorithm (as described below) can be applied to either the actual target symbol surface or a corresponding impression without deviating from the scope of the disclosed subject matter. For example, one exemplary technique comprises a method wherein the surface features (i.e., a target symbol) of an object surface can be physically replicated prior to a digital replication stage. This may be accomplished by applying a secondary material to the object surface, such that an impression and/or mold of the target symbol is created, thereby transferring the surface feature geometry to the secondary material. The secondary material can then be used for subsequent scanning and analysis in place of the primary object, which may prove to be inconvenient or unwieldy (e.g., a turbine blade) to physically access and/or scan with a 3D scanner device. More specifically, this disclosed method is beneficial for in "in-situ" measurements where direct scanning is not possible or feasible due to space, environmental, or other constraints (e.g., maintenance operations where large complex parts are disassembled and shipped for inspection). Moreover, shipping lightweight transfer materials in place of heavy equipment components can improve logistics and lower costs.

In some embodiments, the mold/transfer material (i.e., "secondary material") utilized in this method can comprise any of one or more several substances that are commercially available. Notably, this family of materials can be used to accurately replicate surfaces (e.g., target symbol on an object surface) to such a degree that captured impressions can replicate the grain structure exhibited at the surface of metals. In some embodiments, the secondary material can be applied to an object surface as a viscous liquid, which subsequently cures, hardens, and ultimately reproduces the surface features (e.g., the target symbol) with significant accuracy and detail. While two-part epoxies are a common example of this material's composition, other types of these materials exist and can be used as the applications warrant.

Once the secondary material has cured, it may be removed from the target site, thereby preserving the surface features in the molded impressions of the material. The high elastic yield point of the resulting elastomer preserves the relationship between distinct features even through the stress of the removal process. The resulting mold can then be scanned with a 3D digital scanner to produce the digital replication. Notably, the analysis software (e.g., the deformation analysis algorithm disclosed herein) can be configured to digitally compensate for the fact that a captured mold impression is inverted as compared to the actual features exhibited on the target symbol and/or the asset.

Figure 3:
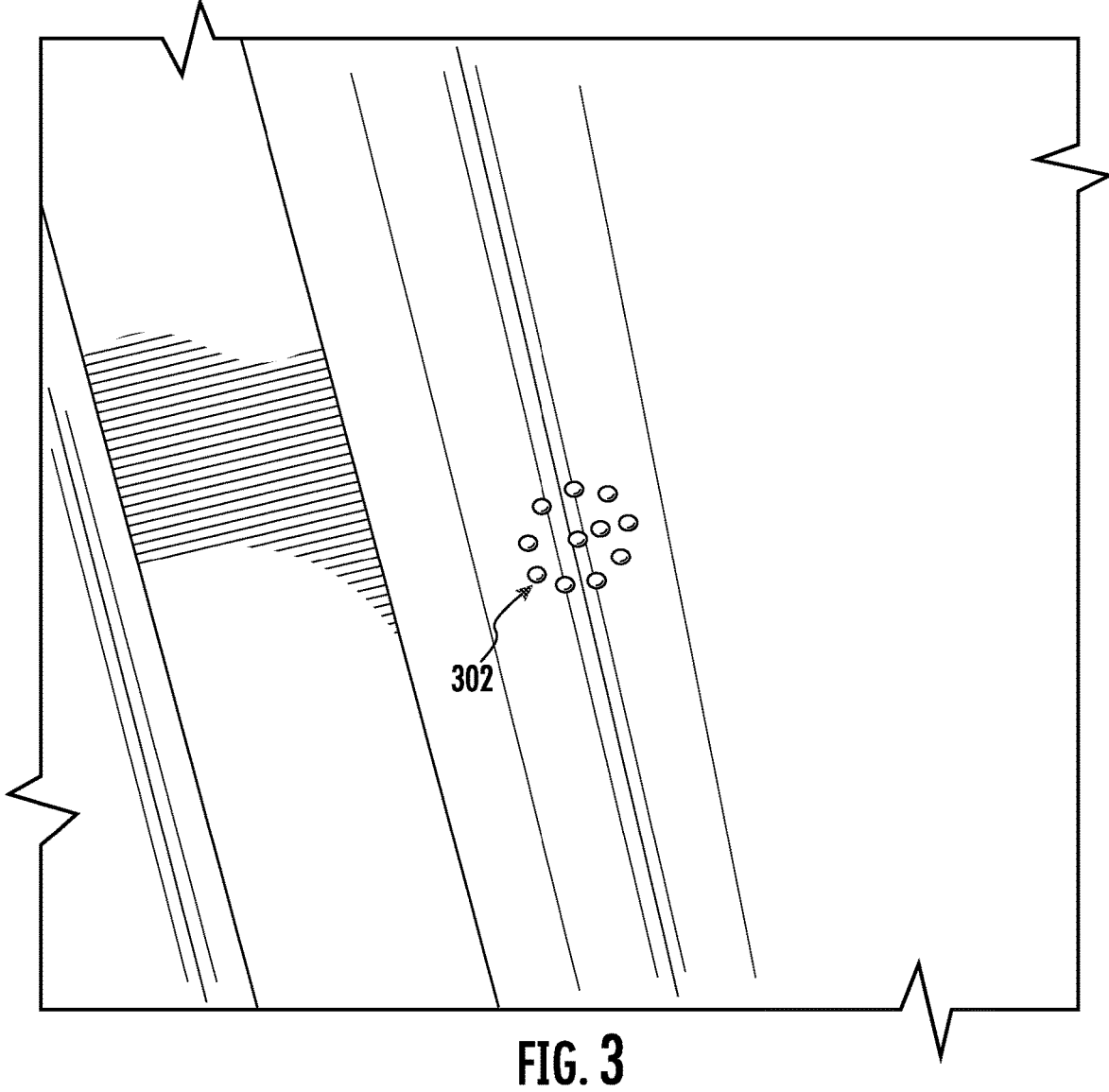
FIG. 3 illustrates an expanded view of a target symbol on an exemplary turbine blade according to an embodiment of the subject matter described herein.

FIG. 3 illustrates an expanded view of the target symbol on an exemplary turbine blade according to an embodiment of the subject matter described herein. More specifically, target symbol 302 as depicted in FIG. 3 is an enlarged view of the surface features of target symbol 204 as shown in FIG. 2. For example, target symbol 204 may comprise an array of eleven paraboloid convex or concave surfaces (or 'surface features') that are affixed to, or integral to, the turbine blade surface. The surface features making up target symbol 204 can be arranged in such a manner that the distance between measurement locations (and resulting position vector lengths) are maximized. Such a configuration and arrangement minimizes error in the volumetric deformation analysis.

Figure 4:
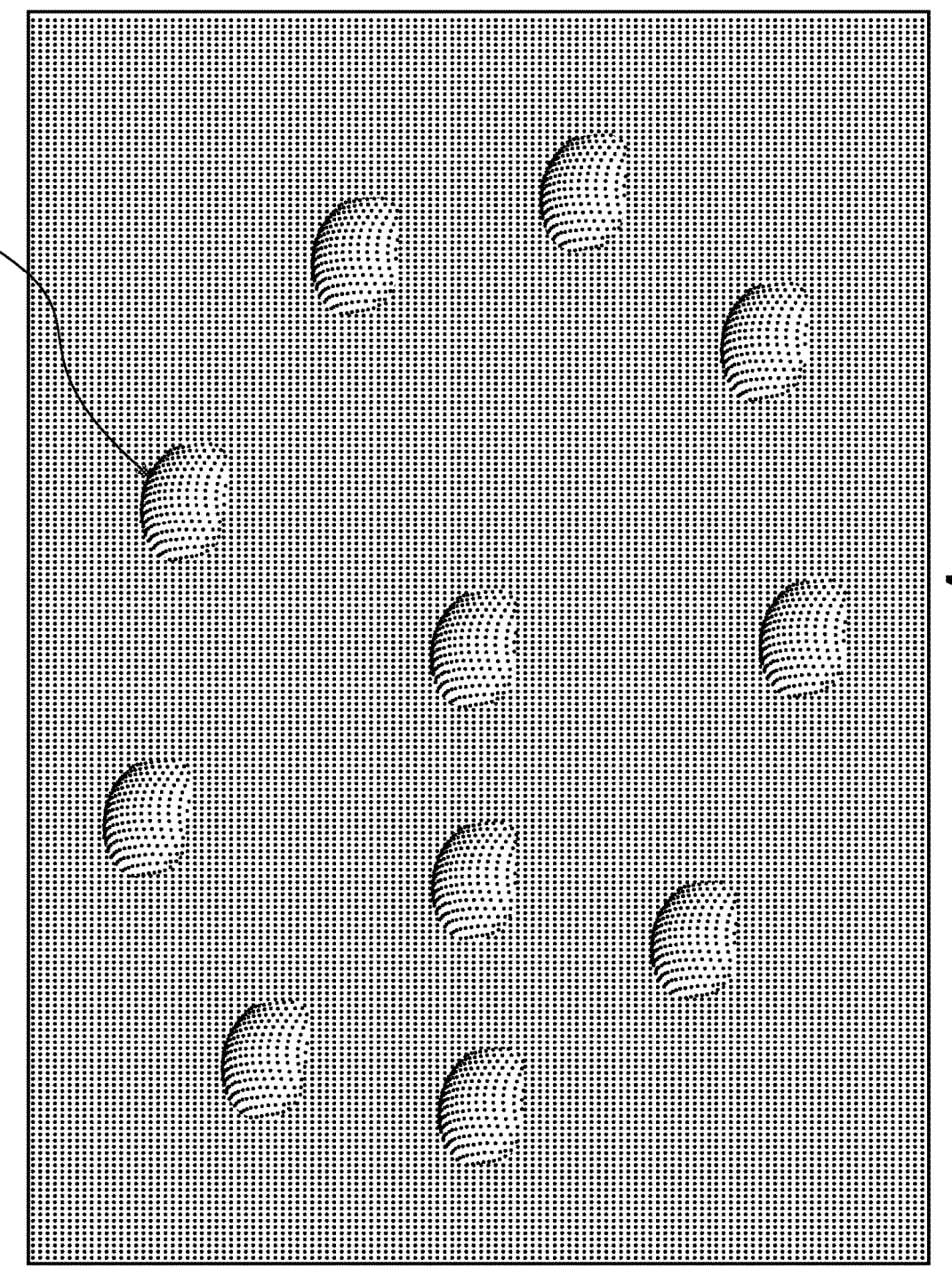
FIG. 4 illustrates an exemplary digital replication of a target symbol on an object surface according to an embodiment of the subject matter described herein.

In some embodiments, an image of the target symbol present on the turbine blade component can be captured within a measurement volume using the 3D scanning device. As used herein, a 3D scanning device may include any device that is used to capture an image of a measurement volume including the target symbol and the component body surface. The 3D scanning device can also be configured to subsequently produce an exact digital replication of the three-dimensional target symbol and corresponding component or object surface within a device dependent measurement volume. For example, the device dependent measurement volume may be based on a 3D scanner device's three-dimensional field-of-view that determines the physical size of the resulting digital replication of the component/object surface and associated 3D target symbol. In some embodiments, the size of the target symbol captured by the scanning device should amount to approximately 40-50% of the measurement volume size (at a minimum). The image capturing process is described in additional detail below and illustrated in FIG. 6. After capturing the image, the 3D scanning device can be configured to utilize the captured image to generate a digital replication of the target symbol. For example, FIG. 4 illustrates an exemplary digital replication of a target symbol 402 on an object surface according to an embodiment of the subject matter described herein. Specifically, replicated target symbol 402 is a digital replication of target symbol 302 shown in FIG. 3. Target symbol 402 as shown in FIG. 4 comprises a digital replication of nine paraboloid-shaped surface features resulting from a 3D scan of the feature region (e.g., the target symbol and measurement volume).

Figure 5:
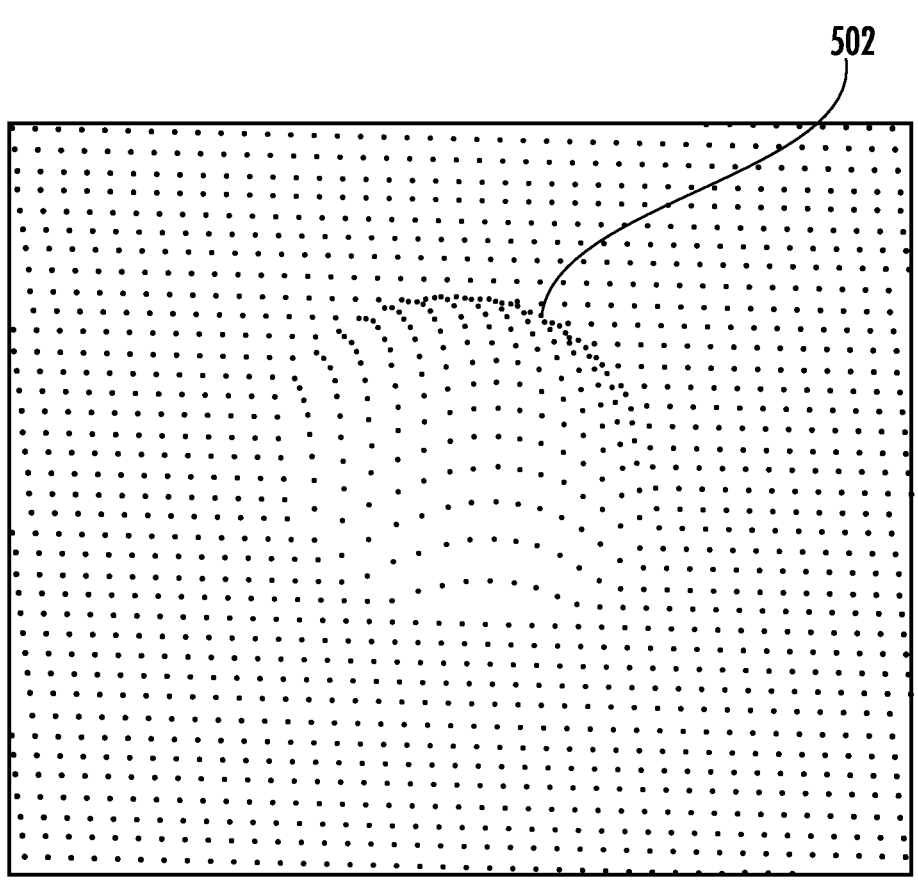
FIG. 5 illustrates an exemplary digital replication of a single surface feature of a target symbol according to an embodiment of the subject matter described herein.

FIG. 5 illustrates an exemplary digital replication of a single surface feature of a target symbol according to an embodiment of the subject matter described herein. In particular, FIG. 5 depicts a digitally replicated surface feature 502, which may represent one of the plurality of surface features belonging to target symbol 402 as shown in FIG. 4. FIG. 5 illustrates an expanded view of a surface feature showing high-density replication data that can be used as an endpoint for a position vector and subsequently utilized in analysis by the disclosed volumetric deformation analysis algorithm.

In some embodiments, the disclosed volumetric deformation analysis algorithm can be embodied as a volumetric deformation analysis engine that is stored in memory of a special-purpose computing device and is executed by one or more hardware processors of the computing device. Notably, the volumetric deformation analysis engine can include an executable algorithm, software program, or any software component that is embodied as and/or within a non-transitory computer readable medium.

Figure 6:
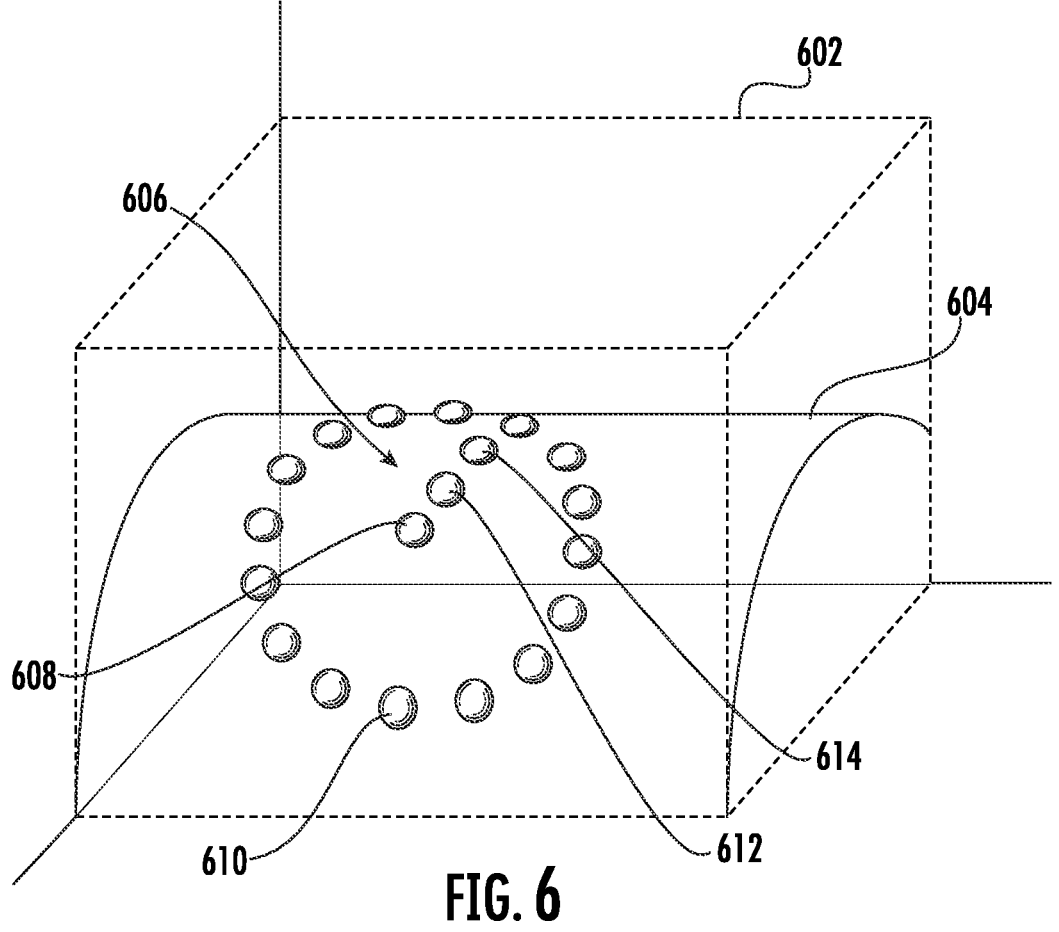
FIG. 6 illustrates an exemplary three-dimensional scanning output of an object surface and target symbol according to an embodiment of the subject matter described herein.

FIG. 6 illustrates an exemplary three-dimensional scanning output of an object surface and target symbol according to an embodiment of the subject matter described herein. In particular, FIG. 6 illustrates a 3D scanning output comprising a digital replication of a measurement volume 602 that includes both the object body surface 604 and 3D target symbol 606. Notably, target symbol 606 shown in FIG. 6 comprises a plurality of surface features largely positioned in a circular arrangement. For example, FIG. 6 illustrates that the target symbol 606 may have a center feature 608 that is surrounded by a plurality of additional surface features (e.g., additional surface feature 610). In some embodiments, the target symbol may require a minimum of six additional surface features in instances where three-dimensional measurements are being made. In other embodiments where 2D or planar measurements are being made, the target symbol may require a minimum of three additional surface features. In some embodiments, the component or object body surface 604 may be a local quadratic surface.

In addition, orientation of the target symbol can be established using the additional surface features (e.g., a minimum of one surface feature) that are positioned between the center surface feature and one of the other surroundings surface features, which form the endpoints of position vectors established and used by the volumetric deformation analysis. Examples of these additional surface feature is represented as additional surface features 612-614. For example, position vectors (as discussed further below) can be formed by connecting a center surface feature location to each surrounding feature location. In order to perform 3D strain analysis, consistent "indexing" of feature locations and position vectors is essential. For example, when a first image capture is acquired and processed, surface features may be numbered 1 through n. Position vectors are determined between features 0-1, 0-2, . . . 0-n. In any subsequent image capture acquisition and analysis, the processing conducted by the volumetric deformation analysis engine must also determine and utilize the exact same feature numbering (i.e., surface feature 1 in the initial image capture must be the same surface feature in any subsequent image). Since image acquisition can occur from any orientation, and if the feature geometry/layout is somewhat symmetric, there may not be an obvious way to determine which "surrounding" surface feature is actually surface feature 1. Notably, the use of the "additional" surface features (e.g., additional surface features 612-614 in FIG. 6) creates a "line" that points to, or otherwise obviates, the starting location for surface feature numbering and/or positioning. Notably, this symbol orientation enables the determination by both human observation and machine vision processing as well as eliminating the need for fixed frame of reference surface scans. Another advantage of the disclosed deformation analysis method includes allowing reregistration of corresponding position vectors in surface scans that are subsequently conducted.

Figure 7:
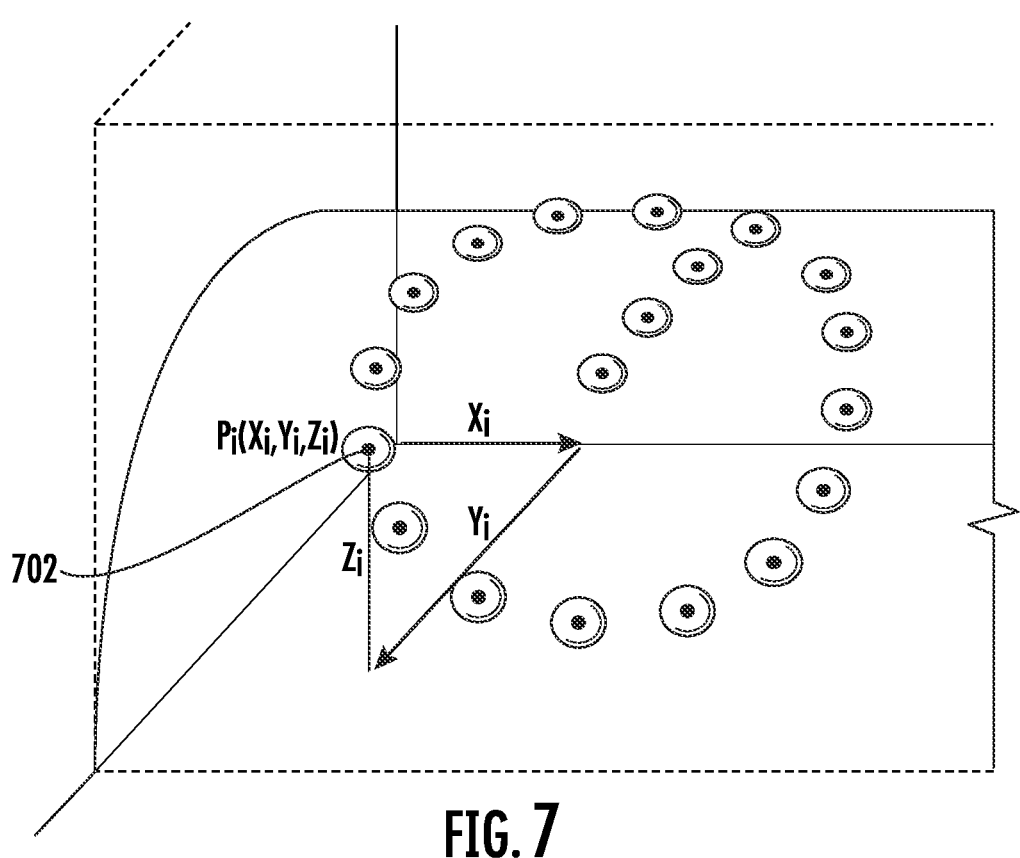
FIG. 7 illustrates an exemplary positioning of a surface feature in a digital coordinate space according to an embodiment of the subject matter described herein.

FIG. 7 illustrates an exemplary positioning of a surface feature in a digital coordinate space according to an embodiment of the subject matter described herein. In some embodiments, the deformation analysis algorithm processes the digital replication illustrated in FIG. 6 and determines the location for a symbol feature existing in a digital coordinate system. For example, the volumetric deformation analysis algorithm can be configured to utilize the digital replication to determine the coordinate position of each of the surface features of the target symbol. For example, as shown in FIG. 7, the coordinate position of surface feature 702 can determined in Cartesian coordinates using a predefined origin. Notably, the positioning of surface feature 702 is defined as $P_i(x_i, y_i, z_i)$, where i serves as an identifier number for a particular surface feature, $x_i$ is the position value of surface feature i with respect to the X axis, where $y_i$ is the position value of surface feature i with respect to the y-axis, and $z_i$ is the position value of surface feature i with respect to the z-axis. This position determination process can be repeated for each of the different surface features (e.g., surrounding surface features, additional surface features, and the center surface feature). More specifically, the volumetric deformation analysis algorithm requires that each symbol feature has an x, y, z location in Cartesian coordinates and that the spatial orientation of the features reside on a locally quadratic surface, i.e., a surface that can be mathematically defined by the general form of the quadratic equation.

Figure 8:
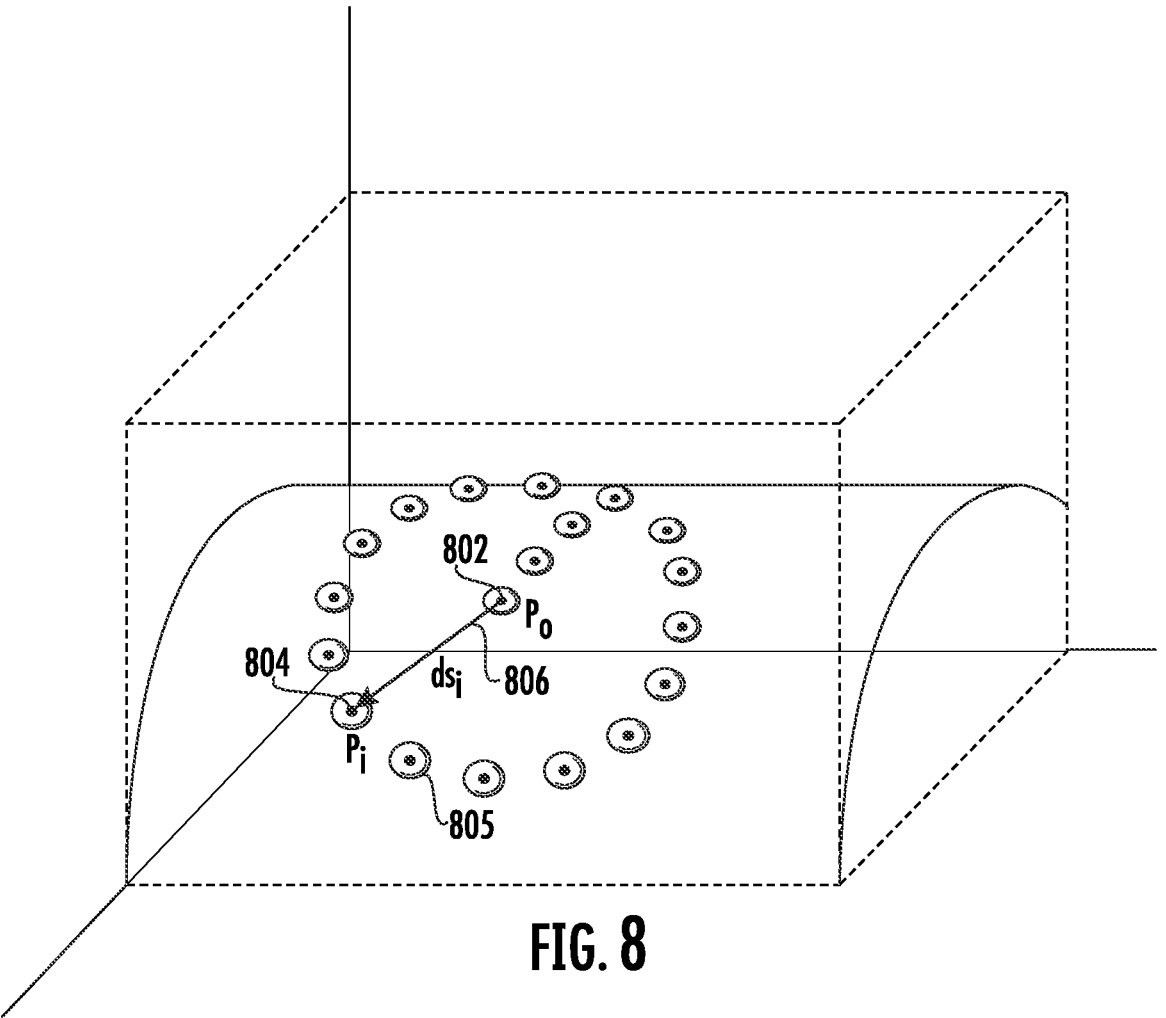
FIG. 8 illustrates an exemplary position vector utilized in volumetric deformation analysis according to an embodiment of the subject matter described herein.

FIG. 8 illustrates an exemplary position vector utilized in volumetric deformation analysis according to an embodiment of the subject matter described herein. In particular, FIG. 8 illustrates an exemplary position vector (e.g., displacement vector, deformation vector, etc.) that is determined during the volumetric deformation analysis executed by the deformation analysis engine. For example, FIG. 8 illustrates a position vector 806 ($dS_i$) which extends from a first point (e.g., a center and/or origin point, $P_0$) defined by a first surface feature 802 to a second point ($P_1$) that is defined by a second surface feature 804. Notably, the volumetric deformation analysis engine determines the length of position vector 806 as it exists in the digital cartesian coordinate system. The deformation analysis engine subsequently determines the length of at least five more position vectors (e.g., $dS_2$, $dS_3$, $dS_4$, $dS_5$, and $dS_6$) originating from the first point, $P_0$, and terminating at a respective at least five more surface features. For example, a second position vector could be defined by endpoints corresponding to surface feature 802 and surface feature 805.

In some embodiments, the deformation analysis engine can be configured to determine the length of at least five more position vectors originating from the first origin point in order to facilitate a measure of redundancy. Notably, the three-dimensional volumetric deformation analysis method determines the exact surface feature locations and the analysis of related position vectors that are located between the center surface feature and a plurality of surrounding surface features.

In some embodiments, multiple target symbols can be configured geometrically to optimize deformation analysis within the digital coordinate space. Geometric configurations may include, but are not limited to, random geometries which are unique, ordered geometries such as data matrix symbols or other code-identifying marks, and arrays comprising of both regular and irregular feature spacing.

FIG. 9 is a flow chart illustrating an exemplary method for utilizing digital replication to measure structural deformation. In some embodiments, method 900 includes an algorithm and/or software process (e.g., a volumetric deformation analysis engine (VDAE) module) that is stored in memory of a VDAE device (e.g., a dedicate computing device or a 3D scanner device) and subsequently executed by one or more hardware processors of the VDAE device (or a hardware based network element hosting and/or supporting the VDAE) and/or a three-dimensional scanning device.

In block 902, a first set of digitized spatial data of a measurement volume and a target's and present on an object body is received. In some embodiments, a three-dimensional scanning device is utilized to scan and capture an image of an object body. In particular, the image captured by the scanning device includes a target symbol that comprises a plurality of surface features present on an object surface.

In some embodiments, the target symbol is contained completely within a measurement volume that is image captured by a 3D scanning device. After capturing the image, the scanning device is configured to send a first set of digitized spatial data to a computing device that hosts the VDAE. Notably, the VDAE receives this digitized spatial data of the measurement volume and the target symbol, which comprises a plurality of surface features that are present on the surface of an object body (or component of interest). In some embodiments, the surface features can comprise paraboloids that are naturally occurring or are manufactured. As indicated above, the surface features can be formed during the casting or machining of the object body, created by additive or subtractive methods, formed by embedding in a coating, or formed by ablating a thermal barrier coating applied to the object body.

In block 904, the first set of digitized spatial data is utilized to generate a first digital replication of the measurement volume and the target symbol. In some embodiments, the VDAE is configured to process the first set of digitized spatial data and subsequently generate a first digital replication that includes a digitally replicated measurement volume and target symbol. The replicated measurement volume comprises a three-dimensional area that includes the target symbol of the object body. More specifically, the measurement volume includes an overall target area that is image captured and subsequently digitally replicated by the VDAE. In some embodiments, the 3D scanner device is configured to generate the first digital replication of the measurement volume and the target symbol.

In block 906, a second set of digitized spatial data of the second measurement volume and the target symbol is received. In some embodiments, the three-dimensional scanning device is utilized to capture the image data of the measurement volume and the target symbol at some point in time (e.g., 1 month, 6 months, 1 year, etc.). In many scenarios, the scanning device is utilized to capture the first set of image data associated with an object body as indicated in block 902 and is subsequently utilized to capture a second set of image data of that same object body at some later date or time.

In block 908, the second set of digitized spatial data is utilized to generate a second digital replication of the second measurement volume and the target symbol. In some embodiments, the VDAE is configured to process the second set of digitized spatial data and subsequently generate a second digital replication that includes a digitally replicated measurement volume and the target symbol. Notably, the measurement volume comprises a three-dimensional area that includes the target symbol on the object body. As indicated above, the measurement volume includes an overall target area that is image captured and subsequently digitally replicated by the VDAE. In some embodiments, the 3D scanner device is configured to generate the second digital replication of the measurement volume and the target symbol.

In block 910, a first spatial orientation of the target symbol is determined by utilizing positions of the plurality of surface features within a digital coordinate system and establishing a first set position vectors. In some embodiments, the VDAE utilizes the respective digital coordinate positioning of the plurality of surface features to generate a number of position vectors corresponding to the target symbol as the target symbol existed during the first image capture (e.g., a first state/stage).

In block 912, a second spatial orientation of the target symbol is determined by utilizing positions of the same plurality of surface features used in block 910 and establishing a second set position vectors using the same digital coordinate system. In some embodiments, the VDAE utilizes the respective digital coordinate positioning of the plurality of surface features to generate the same position vectors corresponding to the target symbol as the target symbol existed during the second image capture (e.g., a second state/stage).

In block 914, the first and second sets of position vectors are compared to determine the relative displacements within the target symbol. In some embodiments, the VDAE can be configured to analyze/compare the position vectors generated from data related to the first digital replication and the position vectors generated from data related to the second digital replication. In particular, the VDAE is able to assess the amount or degree of structural deformation that is exhibited by the relative change of the position vectors over a period of time defined by the states (e.g., the first state and the second state) represented by the first digital replication and the second digital replication. Consequently, the VDAE can also be configured to determine whether a component or object body is exhibiting significant deformation by comparing the relative displacement results to design limits corresponding to a particular component type, such as design specifications pertaining to a gas turbine blade.

Figure 10:
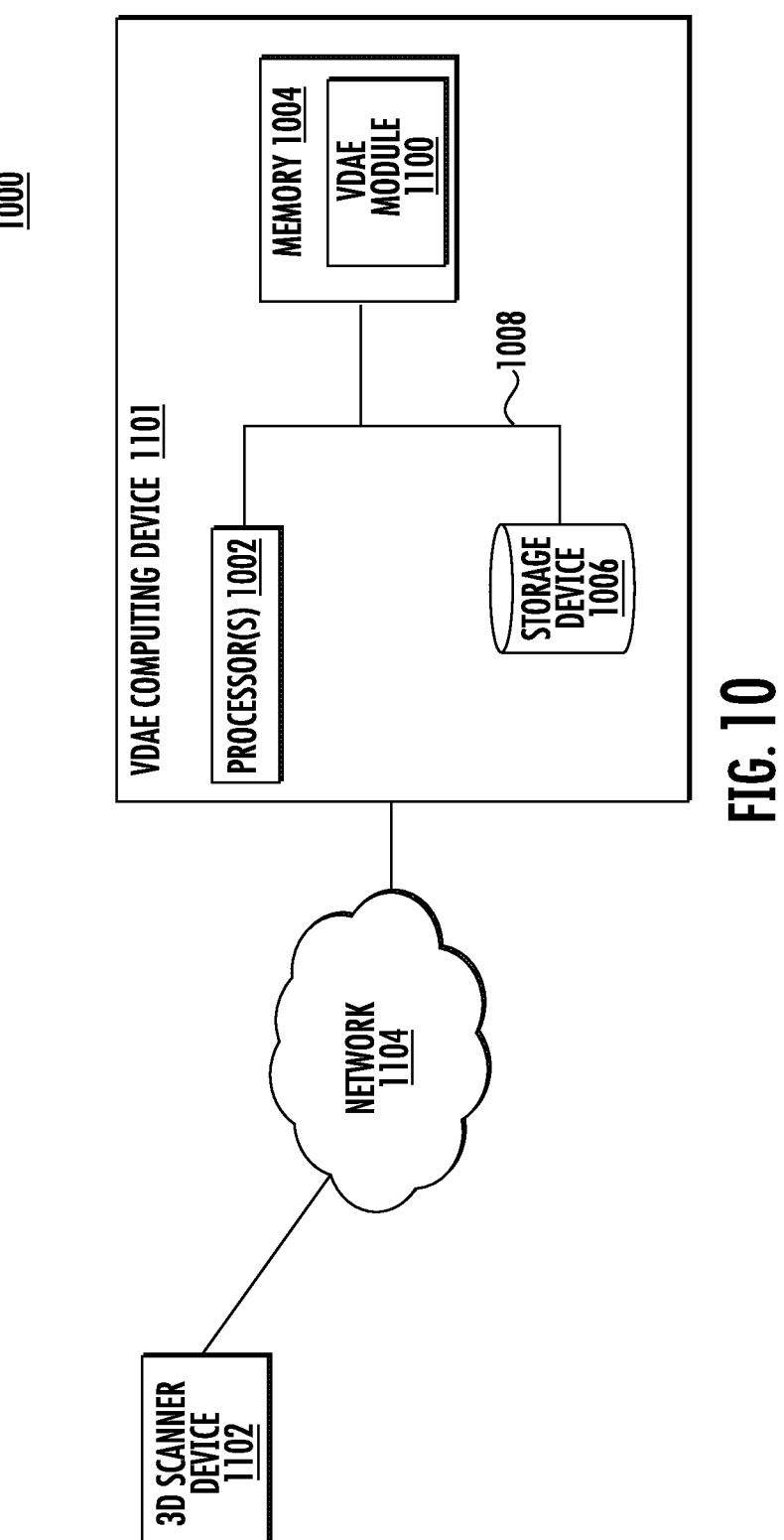
FIG. 10 illustrates a block diagram depicting an exemplary system for utilizing digital replication to measure structural deformation according to an embodiment of the subject matter described herein.

FIG. 10 is a diagram illustrating an exemplary system 1000 for utilizing digital replication to measure structural deformation. Referring to FIG. 10, system 1000 includes a 3D scanner device 1102 and a VDAE computing device 1101 that are communicatively connected by a communications network 1104 (e.g., the Internet, a local area network, a wide area network, or the like). Notably, scanner device 1102 can be configured to capture and communicate displacement reading data associated with a measured target symbol of a structural component (as described above) to VDAE computing device 1101 via communications network 1104. Such communications can be conducted over communications network 1104 in either a wired or wireless manner.

In some embodiments, VDAE computing device 1101 includes a processor 1002, a memory 1004, and a storage device 1006 communicatively connected via a system bus 1008. In some embodiments, processor 1002 can include a microprocessor, central processing unit (CPU), or any other like hardware based processing unit. In some embodiments, an VDAE module 1100 can be stored in memory 1004, which can include random access memory (RAM), read only memory (ROM), optical read/write memory, cache memory, magnetic read/write memory, flash memory, or any other non-transitory computer readable medium. In some embodiments, processor 1002 and memory 1004 can be used to execute and manage the operation of VDAE module 1100. In some embodiments, storage device 1006 can include any storage medium or storage unit that is configured to store data accessible by processor 1002 via system bus 1008. Example storage devices can include one or more local databases hosted by VDAE computing device 1101.

In some embodiments, VDAE module 1100 may be any suitable entity (e.g., software executing on VDAE computing device 1101) for providing one or more aspects of utilizing digital replication to measure structural deformation and assessing relative displacement of target symbols of a structural component. For example, VDAE module 1100 may be configured for performing steps 902-914 described above and depicted in FIG. 9. In alternate embodiments, VDAE module 1100 may be stored on scanner device 1102 instead of VDAE computing device 1101. In such embodiments, scanner device 1102 comprises a stand-alone device that is provisioned with sufficient memory and processing capability for supporting and executing VDAE module 1100.

The disclosed subject matter presents a novel dimension to the world of three-dimensional scanning by affording the ability to measure structural deformation in a three-dimensional digital coordinate space. The method utilized by the volumetric deformation analysis engine is characterized by two properties that enable the disclosed method to be uniquely capable for long-term measurements of structural components (e.g., gas turbine blades). In particular, such long-term measurements serve to manage and/or identify the presence of structural creep and prevent structural failure scenarios. Advantages of the disclosed subject matter include the use of data recorded in a three-dimensional digital format, which can be stored indefinitely and is independent of the recording instruments. Likewise, target symbols positioned on an object body surface can be manufactured for long term use integral to the surface material. In addition, the disclosed method includes a degree of redundancy that is incorporated in case of damage in long term operation of the aforementioned structural components.

Furthermore, failure can occur in structures and operating systems when deformation exceeds pre-determined engineering design limits unless preventive measures are implemented. Structural failures of this type usually occur over extended periods of time and repeated use. Therefore, the ability to measure progressive damage must be capable of operation over these lifetimes without causing additional damage to these systems. Excessive deformations which exceed design limits due to creep introduces a significant cost in many high temperature mechanical systems.

For example, the creep data collected and measured by the disclosed subject matter can add value across various enterprises. As an example, the presence of creep in gas turbine blades represents the most significant cost associated with the operating maintenance of the gas turbines. One benefit afforded by the disclosed subject matter is the ability to identify rapidly creeping turbine blades. Such early identification can reduce risk and improve outage and maintenance planning for that single turbine installation. When similar creep data is collected at multiple installations, turbine owners and maintenance providers are able to learn more about fleet-wide operational factors that impact turbine-blade creep life. This knowledge affects enterprise-level decisions with respect to operations, supply chains, maintenance providers and schedules, and resource planning. Similar enterprise-level benefits exist with high-value assets across multiple markets.

Moreover, the disclosed subject matter can be considered eco-friendly and offers environmental benefits that similar sensor technologies cannot. The onboard elements (e.g., integral target symbols) are passive and require no power. Data is gathered periodically during routine maintenance cycles, which further reduces the monitoring and energy requirements by eliminating the need for a continuous connection to a powered industrial data acquisition system.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for utilizing digital replication to measure structural deformation, the method comprising:
receiving a first set of digitized spatial data of a measurement volume and a target symbol comprising a plurality of surface features present on an object surface;
utilizing the first set of digitized spatial data to generate a first digital replication of the measurement volume and the target symbol;
receiving a second set of digitized spatial data of a second measurement volume and the target symbol comprising the plurality of surface features present on the object surface;

utilizing the second set of digitized spatial data to generate a second digital replication of the second measurement volume and the target symbol;
determining a first spatial orientation of the target symbol utilizing positions of the plurality of surface features within a digital coordinate system corresponding to the first digital replication and subsequently establishing a first set of position vectors contained within the first digital replication, wherein endpoints of each of the position vectors are defined by the coordinate positioning of a pair of the surface features in the first digital replication;
determining a second spatial orientation of the target symbol utilizing positions of the plurality of surface features within a digital coordinate system corresponding to the second digital replication and subsequently establishing a second set of position vectors contained within the second digital replication, wherein endpoints of each of the position vectors are defined by the coordinate positioning of a pair of the surface features in the second digital replication; and
comparing the first and second sets of position vectors to determine relative displacements within the target symbol, wherein the relative displacements are used to determine tri-axial strain components exhibited in a small area of the object surface.

2. The method of claim 1 wherein each of the first digitized spatial data and the second digitized spatial data is obtained by a three-dimensional (3D) scanning device.

3. The method of claim 1 where the plurality of surface features comprise concave paraboloids and/or convex paraboloids.

4. The method of claim 3 wherein the surface features are naturally occurring in the object surface.

5. The method of claim 3 wherein the surface features are formed during casting or machining of the object surface, created by additive or subtractive methods, formed by imbedding in a coating, and/or formed by ablating a thermal barrier coating.

6. The method of claim 1 wherein each of the first set of position vectors and the second set of position vectors includes at least six position vectors.

7. The method of claim 1 wherein the digital coordinate system includes a digital Cartesian coordinate system, a digital polar coordinate system, or a digital NTB coordinate system.

8. A system for utilizing digital replication to measure structural deformation, the system comprising:
at least one processor;
a memory element; and
a volumetric deformation analysis engine (VDAE) that is stored in the memory element and when executed by the at least one processor is configured to:
receive a first set of digitized spatial data of a measurement volume and a target symbol comprising a plurality of surface features present on an object surface, utilize the first set of digitized spatial data to generate a first digital replication of the measurement volume and the target symbol;
receive a second set of digitized spatial data of a second measurement volume and the target symbol comprising the plurality of surface features present on the object surface,
utilize the second set of digitized spatial data to generate a second digital replication of the second measurement volume and the target symbol;

determine a first spatial orientation of the target symbol utilizing positions of the plurality of surface features within a digital coordinate system corresponding to the first digital replication and subsequently establishing a first set of position vectors contained within the first digital replication, wherein endpoints of each of the position vectors are defined by the coordinate positioning of a pair of the surface features in the first digital replication;

determine a second spatial orientation of the target symbol utilizing positions of the plurality of surface features within a digital coordinate system corresponding to the second digital replication and subsequently establishing a second set of position vectors contained within the second digital replication, wherein endpoints of each of the position vectors are defined by the coordinate positioning of a pair of the surface features in the second digital replication; and compare the first and second sets of position vectors to determine relative displacements within the target symbol, wherein the relative displacements are used to determine tri-axial strain components exhibited in a small area of the object surface.

9. The system of claim 8 wherein each of the first digitized spatial data and the second digitized spatial data is obtained by a three-dimensional (3D) scanning device.

10. The system of claim 8 where the plurality of surface features comprise concave paraboloids and/or convex paraboloids.

11. The system of claim 10 wherein the surface features are naturally occurring in the object surface.

12. The system of claim 10 wherein the surface features are formed during casting or machining of the object surface, created by additive or subtractive methods, formed by imbedding in a coating, and/or formed by ablating a thermal barrier coating.

13. The system of claim 8 wherein each of the first set of position vectors and the second set of position vectors includes at least six position vectors.

14. The system of claim 8 wherein the digital coordinate system includes a digital Cartesian coordinate system, a digital polar coordinate system, or a digital NTB coordinate system.

15. A non-transitory computer readable medium having stored thereon executable instructions that when executed by a processor of a computer control the computer to perform steps comprising:

receiving a first set of digitized spatial data of a measurement volume and a target symbol comprising a plurality of surface features present on an object surface;

utilizing the first set of digitized spatial data to generate a first digital replication of the measurement volume and the target symbol;

receiving a second set of digitized spatial data of a second measurement volume and the target symbol comprising the plurality of surface features present on the object surface;

utilizing the second set of digitized spatial data to generate a second digital replication of the second measurement volume and the target symbol;

determining a first spatial orientation of the target symbol utilizing positions of the plurality of surface features within a digital coordinate system corresponding to the first digital replication and subsequently establishing a first set of position vectors contained within the first digital replication, wherein endpoints of each of the position vectors are defined by the coordinate positioning of a pair of the surface features in the first digital replication;

determining a second spatial orientation of the target symbol utilizing positions of the plurality of surface features within a digital coordinate system corresponding to the second digital replication and subsequently establishing a second set of position vectors contained within the second digital replication, wherein endpoints of each of the position vectors are defined by the coordinate positioning of a pair of the surface features in the second digital replication; and comparing the first and second sets of position vectors to determine relative displacements within the target symbol, wherein the relative displacements are used to determine tri-axial strain components exhibited in a small area of the object surface.

16. The non-transitory computer readable medium of claim 15 wherein each of the first digitized spatial data and the second digitized spatial data is obtained by a three-dimensional (3D) scanning device.

17. The non-transitory computer readable medium of claim 15 where the plurality of surface features comprise concave paraboloids and/or convex paraboloids.

18. The non-transitory computer readable medium of claim 17 wherein the surface features are naturally occurring in the object surface.

19. The non-transitory computer readable medium of claim 17 wherein the surface features are formed during casting or machining of the object surface, created by additive or subtractive methods, formed by imbedding in a coating, and/or formed by ablating a thermal barrier coating.

20. The non-transitory computer readable medium of claim 15 wherein each of the first set of position vectors and the second set of position vectors includes at least six position vectors.

21. The non-transitory computer readable medium of claim 15 wherein the digital coordinate system includes a digital Cartesian coordinate system, a digital polar coordinate system, or a digital NTB coordinate system.

* * * * *